United States Patent [19]

Richter et al.

[11] Patent Number: 5,448,566
[45] Date of Patent: Sep. 5, 1995

[54] METHOD AND APPARATUS FOR FACILITATING COMMUNICATION IN A MULTILAYER COMMUNICATION ARCHITECTURE VIA A DYNAMIC COMMUNICATION CHANNEL

[75] Inventors: Roger K. Richter, Round Rock; David R. Stark, Jr., Austin, both of Tex.

[73] Assignee: International Business Machines Corporation, Armonk, N.Y.

[21] Appl. No.: 152,795

[22] Filed: Nov. 15, 1993

[51] Int. Cl.[6] .............................................. H04J 3/16
[52] U.S. Cl. ................................................. 370/94.1
[58] Field of Search ................. 370/85.13, 85.14, 85.7, 370/94.1, 94.2, 93, 92, 110.1, 60, 60.1, 110.1, 58.1; 379/94, 96, 95.1, 58.1, 54, 85.1, 85.7, 79, 17; 395/500, 200, 275, 325

[56] References Cited

U.S. PATENT DOCUMENTS

| | | | |
|---|---|---|---|
| 4,547,880 | 10/1985 | De Vita et al. | 370/91 |
| 4,866,703 | 9/1989 | Black et al. | 370/60 |
| 4,866,758 | 9/1989 | Heinzelmann | 379/94 |
| 4,910,507 | 3/1990 | Shimizu et al. | 340/825.5 |
| 4,985,892 | 1/1991 | Camarata | 370/123 |
| 4,996,685 | 2/1991 | Farese et al. | 370/58.1 |
| 5,062,108 | 10/1991 | Bales et al. | 370/110.1 |
| 5,280,481 | 1/1994 | Chang et al. | 370/94.1 |

OTHER PUBLICATIONS

IBM Technical Disc. Bulletin vol. 34 No. 7A, Dec. 1991 "Method Of Bandwidth Management By Dynamic Port Configuration".

Primary Examiner—Douglas W. Olms
Assistant Examiner—Huy D. Vu
Attorney, Agent, or Firm—Jeffrey S. LaBaw; L. Bruce Terry; Andrew J. Dillon

[57] ABSTRACT

A data processing system is provided for interfacing with a computing resource coupled to a remotely located network. A multilayer communication architecture, implemented utilizing a multilayer protocol stack, is provided for facilitating communication between network resources and applications running within the data processing system. Within the multilayer protocol stack, a media access control emulator is provided for interfacing with an application requesting access to a computer resource coupled to a remotely located network. The media access control emulator presents a standard media access control interface to the requesting application. A connection utility is provided for managing communication between the media access control emulator and a dynamic communication channel. In response to receiving an application or user instigated request to communicate with the computing resource coupled to the remotely located network, the media access control emulator automatically suspends access to the remotely located computer resource by emulating a pre-established operating condition, such as discarding a packet of data sent by the application and returning an out of resource indication to the application. During such automatic suspension of access, the connection utility establishes communication with the remotely located network via the dynamic communication channel. Once communication has been established, the requesting application is allowed access to the computer resource coupled to the remotely located network via the dynamic communication channel, wherein the media access control emulator and the connection utility mask the dynamic nature of the dynamic communication channel from the requesting application.

21 Claims, 8 Drawing Sheets

METHOD AND APPARATUS FOR FACILITATING COMMUNICATION IN A MULTILAYER COMMUNICATION ARCHITECTURE VIA A DYNAMIC COMMUNICATION CHANNEL

BACKGROUND OF THE INVENTION

1. Technical Field

The present invention relates in general to a method and system for interfacing a computing resource coupled to a remotely located network with an application running within a data processing system, via a dynamic communication channel, and in particular to a method and system for enabling local area network (LAN) applications to communicate with remote computing resources via the public switched telephone network (PSTN) without modification of the LAN applications and existing multilayer protocol stacks.

2. Description of the Related Art

A computer network, which may also be called a distributed data processing system, comprises a set of communication channels interconnecting a set of computing devices or nodes that have the ability to communicate with one another. The nodes may be data processing systems, computers, terminals, workstations, communication units such as modems and bridges, or peripheral devices such as printers, output devices, or scanners. Such nodes communicate via communication channels, which may utilize a variety of transmission media. Some examples of commonly utilized transmission media include optical fibers, co-axial cable, twisted-pair wires, infrared radiation, or electromagnetic radiation, as utilized in satellite links and digital microwave radio. Such nodes may be distributed over a wide area (distances of hundreds or thousands of miles) or over a local area (distances of a hundred feet to several miles), in which case the networks are called wide area networks (WANs) or local area networks (LANs), respectively.

For many years, data processing system users have recognized and enjoyed the benefits of sharing data among data processing systems, and accessing computer resources connected to the local area network (LAN), such as other data processing systems, printers, input/output devices, and communication devices such as modems or bridges. Recently, it has become necessary to provide a communication channel between such local area networks and a remote data processing system, such as a portable computer, via a dynamic communication channel. This dynamic communication channel may be characterized by its transient nature (i.e., the ability to establish and disconnect at will) and the ability to change physical media or hardware each time such a communication channel is established.

One example of a dynamic communication channel is a public switched telephone network (PSTN). A data processing system user may establish and disconnect a communication channel via the public switched telephone network at any time, and, if multiple communication ports are available within the user's data processing system, the user may choose through which communication port the dynamic communication channel is established. Furthermore, the user may choose to establish different communication channels at different times, or establish multiple communication channels at the same time, all of which may be accomplished by instructing the data processing system and the associated communications hardware (i.e., a modem) to call and connect with various networks. The problem with such versatility in establishing dynamic communication channels is that standard local area networks and local area network applications are not designed to accommodate the dynamic nature of the dynamic communications channel.

Within the local area network, data processing systems and computer resources connected to the local area network utilize standard protocols, implemented utilizing standard architectures, for data communication. These local area network architecture standards are employed because such standards allow different software and hardware providers to manufacture products that are compatible with one another, and that work together to connect data processing systems. One such standard architecture is NDIS (Network Drive Interface Specification), which is utilized in DOS, Windows, and OS/2 environments. The NDIS environment/architecture was jointly developed by Microsoft Corporation and 3Com, and is a popular implementation of the IEEE (Institute of Electrical and Electronic Engineers) LAN architecture. Persons skilled in the art will recognize that several other standard architectures are available for implementing local area networks.

Although such local area network architecture standards have increased the compatibility of software and hardware products, these LAN standards have a serious drawback for users who wish to connect to a remote LAN via a dynamic communications channel, such as the PSTN. That drawback is that these LAN standards are normally designed to operate in a static environment. For example, once a network has been established, applications operating in that network expect relationships between hardware, physical media, and software to remain constant or static. Such relationships include relationships between: LAN applications and LAN protocol stacks; LAN protocol stacks and logical adapter numbers; logical adapter numbers and media access controls; media access controls and LAN addresses; LAN addresses and LAN adapters; LAN adapters and LAN wires or physical media; LAN wires or physical media and LAN networks; and LAN networks and LAN nodes.

Many of the relationships described above are created through a "binding" process during network initialization. Once the binding process is complete, a change in a relationship between entities is disruptive to the LAN applications and network operations in general. Additionally, LAN applications typically are not designed to handle a communications channel that may be established or disconnected at any time, and which may be established utilizing different addresses or ports in each instance. Also, LAN applications typically are not designed to control the myriad hardware devices which may be provided to establish communication via a dynamic communication channel.

Therefore, it should be apparent that a need exists for a method and system for enabling LAN applications to communicate with a remote computing resource connected to a remotely located local area network via a dynamic communications channel.

SUMMARY OF THE INVENTION

It is one objective of the present invention to provide a method and system for interfacing a computing resource coupled to a remotely located network with an application running within a data processing system, via a dynamic communication channel.

It is another objective of the present invention to provide a method and system for enabling local area network (LAN) applications to communicate with computing resources via the public switched telephone network (PSTN) without modification to the LAN applications and existing multilayer protocol stacks.

It is yet another objective of the present method and system to render the lower level connection type transparent from the LAN application, thereby allowing connectivity via asynchronous, synchronous, and integrated services digital network (ISDN) public switched telephone network (PSTN) connections.

It is yet another objective of the present invention to provide a communications interface system for interfacing LAN applications to computing resources via a dynamic communication channel, at the media access control (MAC) sublayer within a multilayer communication architecture.

These and other objectives are achieved as is now described. A data processing system is provided for interfacing with a computing resource coupled to a remotely located network. A multilayer communication architecture, implemented utilizing a multilayer protocol stack, is provided for facilitating communication between network resources and applications running within the data processing system. Within the multilayer protocol stack, a media access control emulator is provided for interfacing with an application requesting access to a computer resource coupled to a remotely located network. The media access control emulator presents a standard media access control interface to the requesting application. A connection utility is provided for managing communication between the media access control emulator and a dynamic communication channel. In response to receiving an application or user instigated request to communicate with the computing resource coupled to the remotely located network, the media access control emulator automatically suspends access to the remotely located computer resource by emulating a pre-established operating condition, such as discarding a packet of data sent by the application and returning an out of resource indication to the application. During such automatic suspension of access, the connection utility establishes communication with the remotely located network via the dynamic communication channel. Once communication has been established, the requesting application is allowed access to the computer resource coupled to the remotely located network via the dynamic communication channel, wherein the media access control emulator and the connection utility mask the dynamic nature of the dynamic communication channel from the requesting application.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
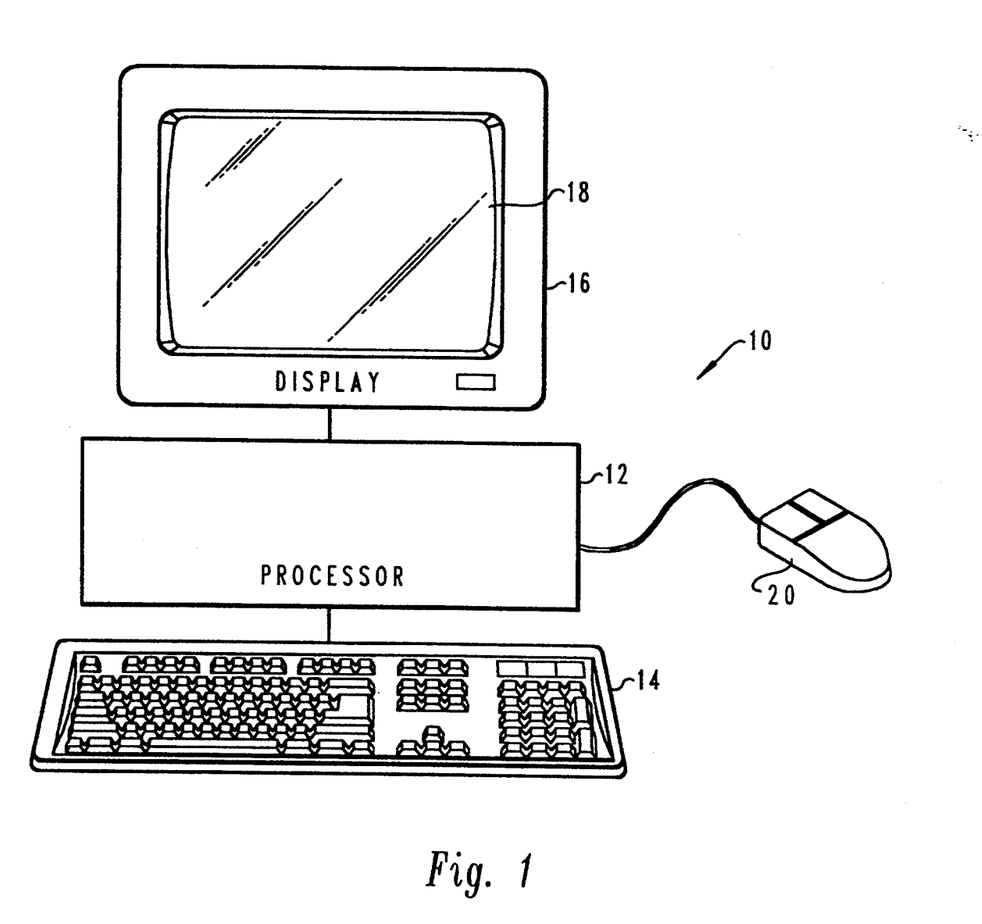
FIG. 1 depicts a data processing system which may be utilized to implement a preferred embodiment of the present invention.

With reference now to the figures and in particular with reference to FIG. 1, there is depicted a data processing system 10 which includes processor 12, keyboard 14, and display 16. Display 16 includes display screen 18, which may be implemented utilizing a cathode ray tube (CRT), a liquid crystal display (LCD), an electroluminescent panel, or the like. Data processing system 10 also includes pointing device 20 which may be implemented utilizing a track ball, joystick, a touch sensitive tablet or screen, or as illustrated in FIG. 1, a mouse. Pointing device 20 may be utilized to move a pointer or cursor on display screen 18.

Those persons skilled in the art will appreciate that data processing system 10 may comprise a personal computer system well known in the prior art, such as the personal computer sold under the trademark PS/2, and manufactured by International Business Machines Corporation of Armonk, N.Y.

Figure 2:
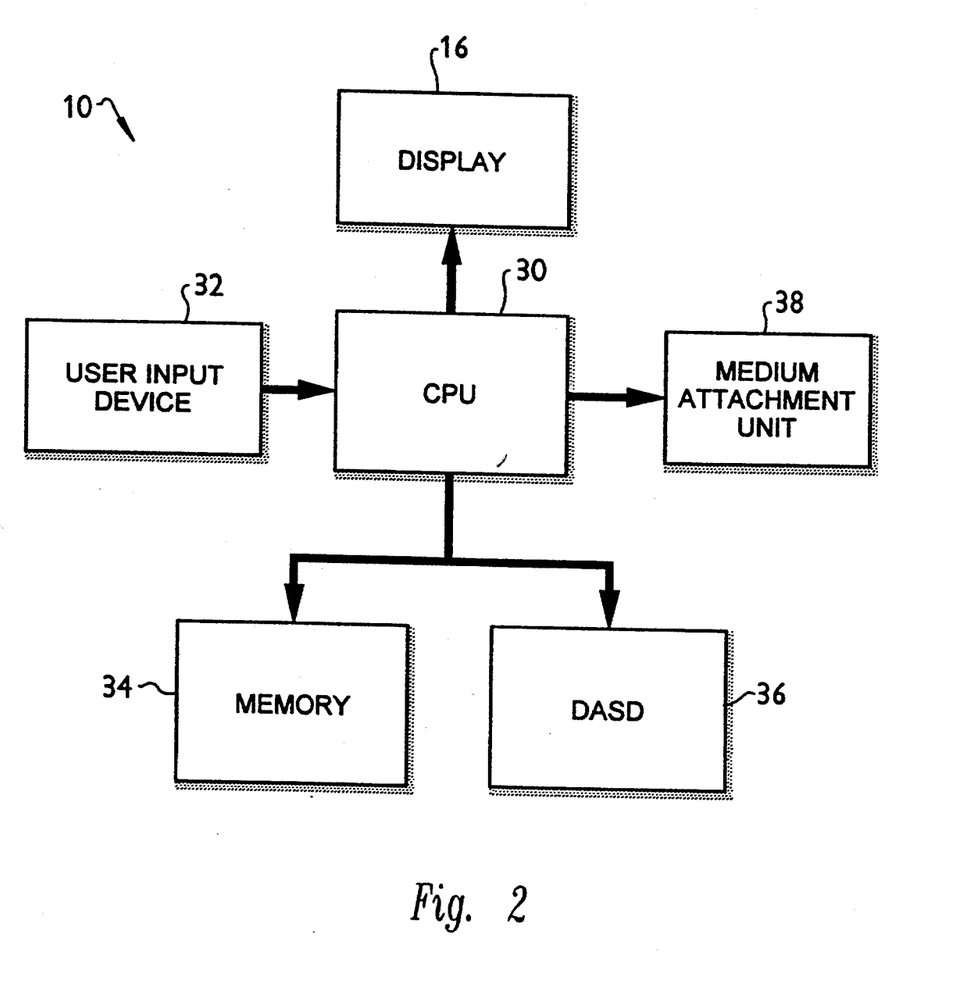
FIG. 2 is a more detailed high-level block diagram further illustrating the major components of the data processing system of FIG. 1.

FIG. 2 is a more detailed high-level block diagram further illustrating the major components of data processing system 10 of FIG. 1. Data processing system 10 is controlled primarily by instructions, in the form of software, executed within central processing unit (CPU) 30. CPU 30 is coupled to display 16, which is utilized to display text and graphics. CPU 30 is also coupled to user input device 32, which is utilized to receive input from a data processing system user. User input device 32 may include keyboard 14 and pointing device 20, as illustrated in FIG. 1. Memory 34 and direct access storage device (DASD) 36 may be utilized for storing application programs (i.e., software) and data sets.

Medium attachment unit 38 may also be included in data processing system 10. Medium attachment unit 38 is a device utilized to couple data processing system 10 to a transmission medium. Such a transmission medium may be any material substance that can be utilized for the propagation of signals, from one point to another, such as optic fiber, cable, wire, water, air, or free space. Thus, medium attachment unit 38 permits data processing system 10 to send and receive electrical signals within with a selected transmission medium.

Figure 3:
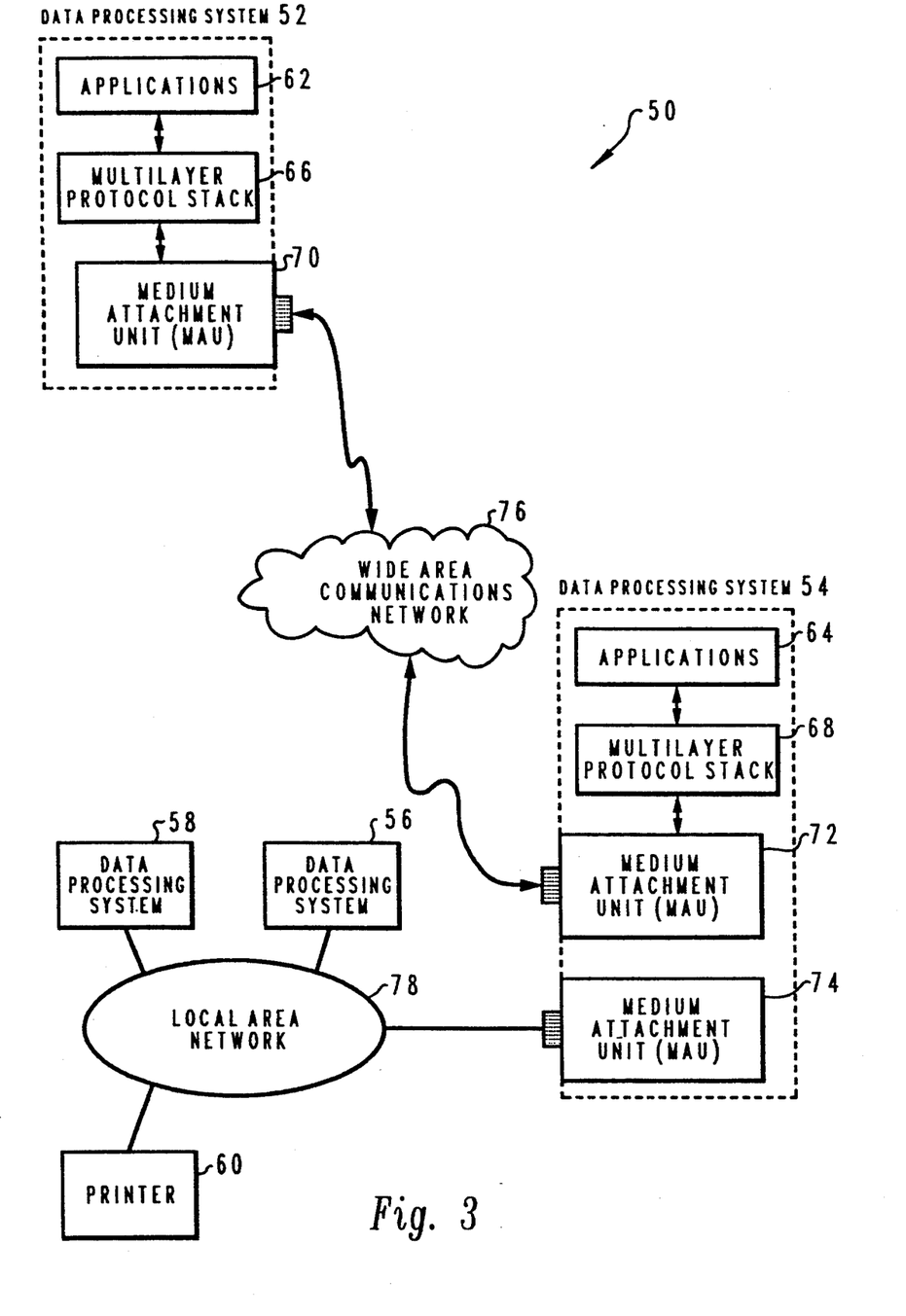
FIG. 3 depicts a distributed data processing system utilizing a multilayer communication architecture.

With reference now to FIG. 3, there is depicted a distributed data processing system 50. As illustrated, distributed data processing system 50 includes data processing systems 52, 54, 56, and 58. Distributed data processing system 50 may also include computing resources, such as printer 60. Other computing resources may be included, such as file servers, or other input-/output devices, such as plotters or scanners.

Data processing systems 52, 54, 56, and 58 may include applications capable of communicating via a network. In FIG. 3, such applications are shown as applications 62 and 64. In order to facilitate communication between data processing systems, a multilayer communication architecture may be utilized. One example of such a multilayer communication architecture is the Open Systems Interconnection (OSI). Other networking architectures, such as IBM's System Network Architecture (SNA), Digital Equipment Corporation's Digital Network Architecture (DNA), may also be utilized.

Typically, multilayer communication architectures are implemented utilizing a multilayer protocol stack. The multilayer protocol stack defines services and protocols at the layers defined by the multilayer architectural standards. Such a multilayer protocol stack will be described in greater detail with reference to FIG. 4. Examples of multilayer protocol stacks are illustrated at multilayer protocol stacks 66 and 68.

Medium attachment units (MAUs) 70, 72, and 74 are utilized to couple data processing systems 52, 54, 56 and 58 with various communication media utilized in distributed data processing system 50. For example, medium attachment unit 70 and 72 couple data processing systems 52 and 54 to wide area communications network 76. Similarly, medium attachment unit 74 couples data processing system 54 to local area network 78. The medium attachment units which couple data processing systems 56 and 58 to local area network 78 are not shown.

Wide area network 76 may be implemented utilizing permanent physical connections (i.e., dedicated lines or private lines), circuit-switched physical connections (e.g., dial up service), or demand digital service (packet switching). However, wide area network 76 is usually provided by common carriers, such as public switched telephone networks (PSTNs).

Local area network 78 may be implemented utilizing any one of several known physical media and electrical protocols. For example, the physical medium may utilize co-axial cable, twisted-pair cabling, or fiber-optic cable.

Figure 4:
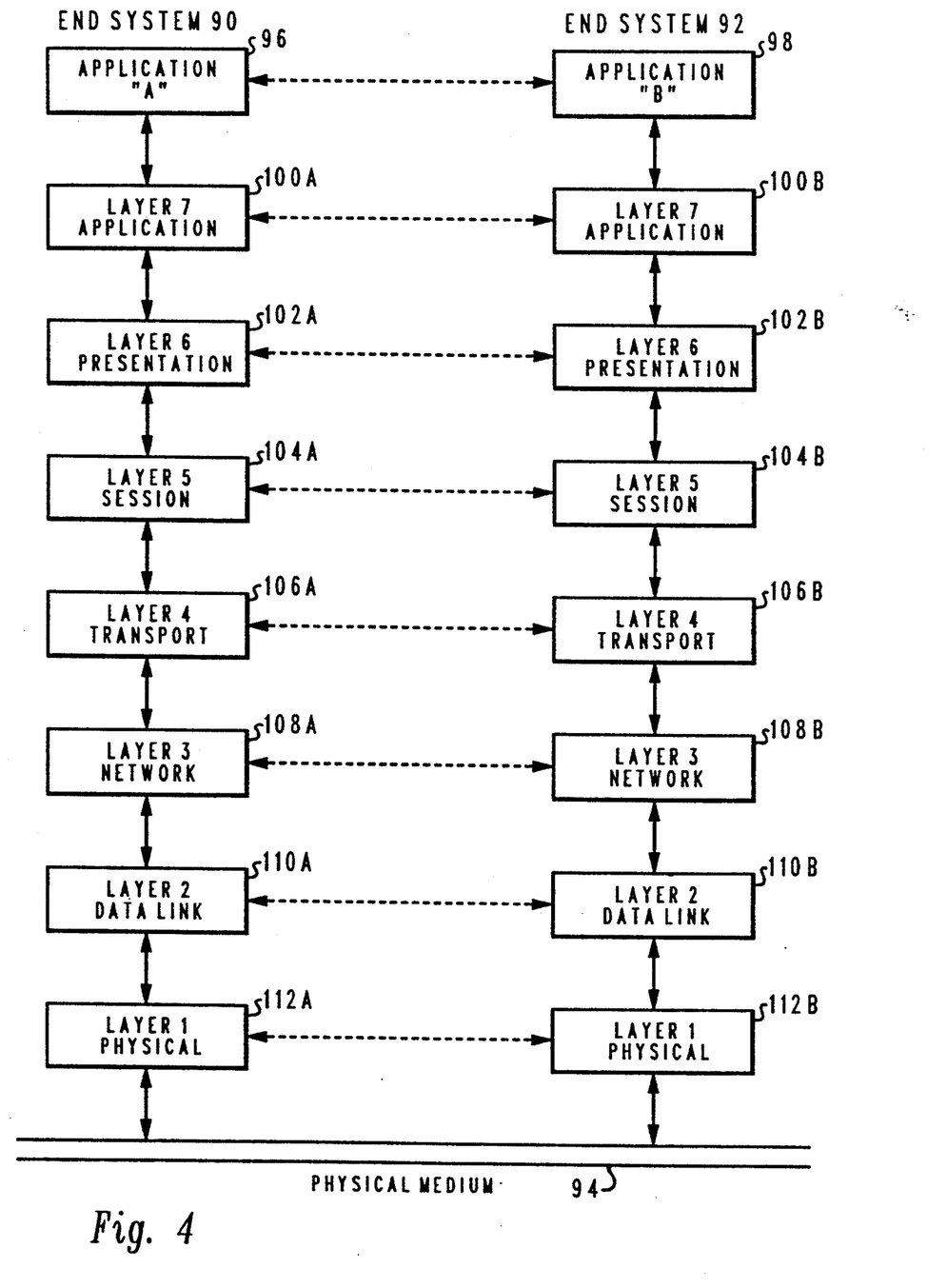
FIG. 4 is a block diagram of the Open Systems Interconnection (OSI) seven-layer reference model.

Referring now to FIG. 4, there is depicted a block diagram of the Open Systems Interconnection (OSI) reference model. The OSI reference model is an arbitrary, hierarchical decomposition of computer communications functions into seven levels of abstraction called layers. The individual layers of a network architecture are realized with service and protocol definitions. For example, end system 90 and 92 may each be coupled to physical medium 94, and may contain application "A" 96 and application "B" 98, respectively. If application "A" 96 is instructed to communicate with application "B" 98, application "A" utilizes the services of the seven layers below application "A" to place data on physical medium 94. Similarly, application "B" 98 utilizes the services of the seven layers below application "B" to receive data from physical medium 94. The seven layers in such a multilayer protocol stack are: application layers 100A and 100B; presentation layers 102A and 102B; session layers 104A and 104B; transport layers 106A and 106B; network layers 108A and 108B; data link layers 110A and 110B; and physical layers 112A and 112B. As user data is sent down the protocol stack, each layer normally builds a protocol data unit (PDU) in response to a service request from a next higher level by wrapping that layer s own protocol headers and trailers around data units passed down from the next higher level. Data reception occurs in a reverse order: each layer strips its own protocol control information from data units received from a next lower level. Of particular importance to the present invention is the configuration of the data link layer 110, which is discussed below with reference to FIG. 5.

Figure 5:
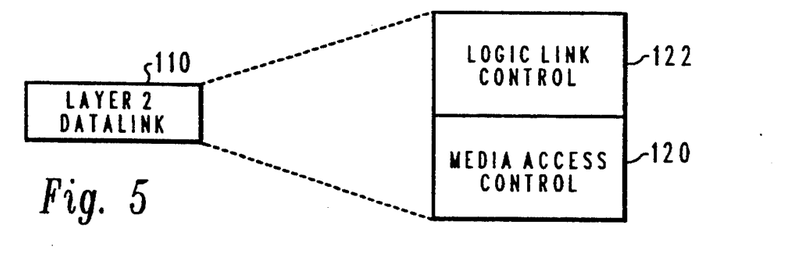
FIG. 5 is a block diagram representation of the data link layer within a multilayer protocol stack, as illustrated in FIGS. 3 and 4.

FIG. 5 is a block diagram representation of the data link 110 layer within multilayer protocol stack 66, as illustrated in FIG. 3 and 4. IEEE standards for LANs are defined as layered architectures, similar to, and compatible with, but not identical to the OSI reference model. The primary difference between IEEE models and OSI is the splitting of OSI layer 2, data link layer 110, into two sublayers: the media access control (MAC) 120 sublayer and the logical link control (LLC) 122 sublayer. Media access control 120 manages the medium attachment units (MAUs), and controls access to the communications medium. The logical link control (LLC) 122 provides the state machine for supporting the protocol specified by an associated data link control (DLC).

Figure 6:
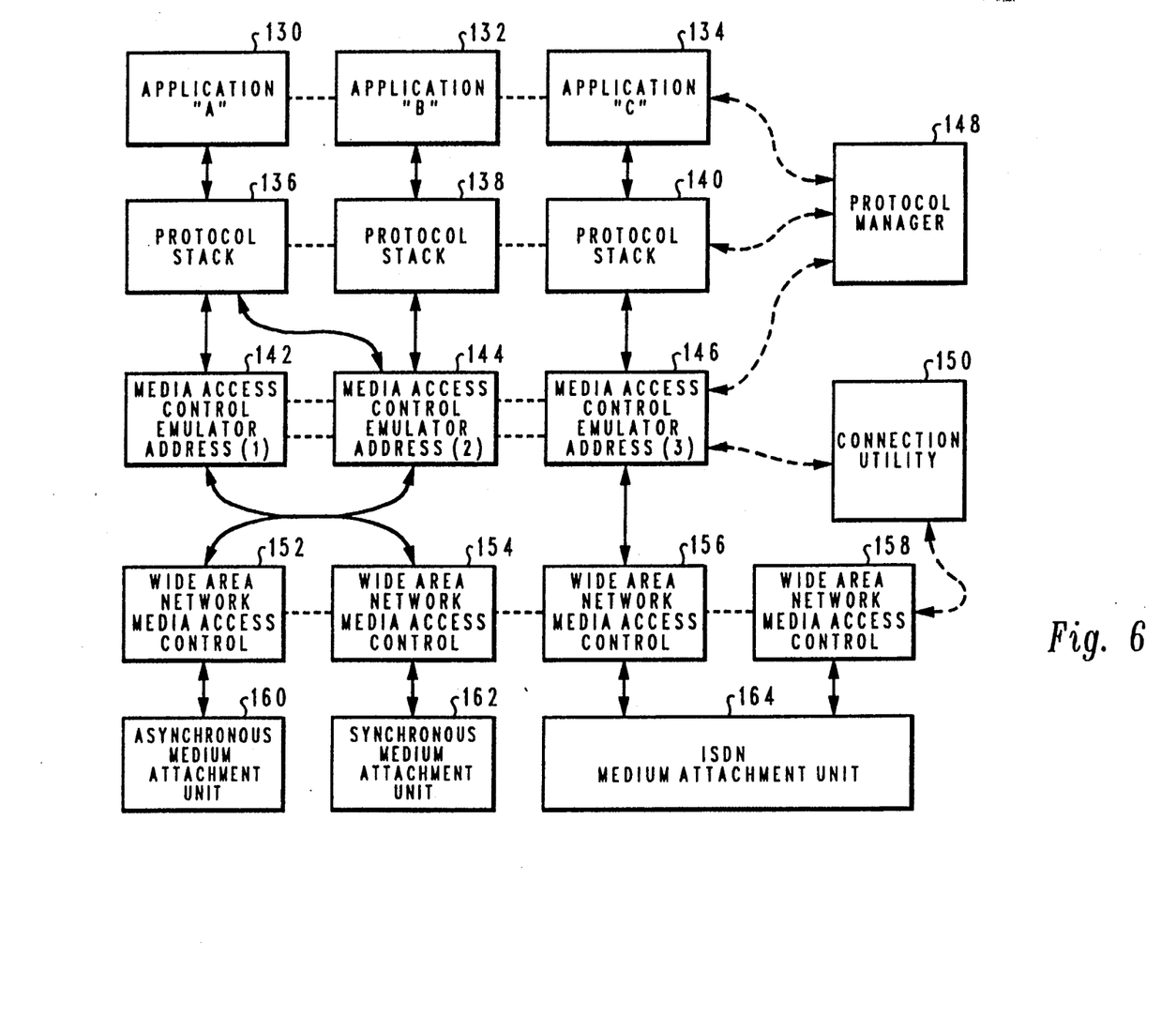
FIG. 6 is a block diagram representation control and data flow between multiple applications, multilayer protocol stacks, and medium attachment units.

FIG. 6 is a block diagram representation of control and data flow between multiple applications, multilayer protocol stacks, and medium attachment units. As illustrated, application "A" 130, application "B" 132, and application "C" 134 are permitted to utilize the communication services provided by protocol stacks 136, 138, and 140, to communicate, via a network, utilizing appropriate protocols. In this figure, protocol stacks 136, 138, and 140 represent layers 3 through 7, as illustrated in FIG. 4 with reference numerals 100–108, and the logical link control 122 sublevel of the data link layer 110, as illustrated in FIG. 5.

In accordance with an important aspect of the present invention, media access control emulators 142, 144, and 146 are provided as a sublayer within data link layer 110. Media access control emulators 142 are able to bind with protocol stacks 136, 138 and 140 in a manner well known in the prior art. Such a binding process comprises exchanging a set of tables that list and describe configuration parameters, such as functions provided, addresses of such function routines, attributes, and status information. If the protocol stack determines that it can support, or is compatible with, a media access control emulator, they are permitted to bind.

Such a binding process is controlled by protocol manager 148. Once a protocol stack and a media access control emulator have been bound to one another, a set of configuration parameters and functions are permanently set until protocol manager 148 forces a change (i.e., a rebind) in the communication environment. Such a change in the communication environment is disruptive to local area network operations and is preferably rare. Typically, such a bind operation is performed once during system initialization, wherein protocol manager 148 configures the communication environment and binds protocol layers in accordance with data stored in a common configuration file (i.e., a Protocol.INI file). Such configuration data is predetermined by a data processing system user. The operation of media access control emulators 142, 144, and 146 is described below with reference to FIGS. 7, 8, and 9.

In accordance with another important aspect of the present invention, connection utility 150 is provided for establishing and disconnecting dynamic communication channels, and binding and unbinding media access control emulators 142, 144, and 146 with an appropriate wide area network media access control, such as wide area network media access controls 152, 154, 156, and 158. In order to provide these two major functions, control information flows between connection utility 150 and media access control emulators 142–146 and wide area network media access controls 152–158, as illustrated by dashed lines connected to connection utility 150.

Each wide area network media access control 150–158 is associated with a medium attachment unit, which is utilized to couple the data processing system to the transmission medium. For example, wide area network media access control 152 is associated with an asynchronous medium attachment unit 160. Similarly, wide area network media access control 154 is associated with synchronous medium attachment unit 162 and wide area network media access controls 156 and 158 are associated with ISDN medium attachment unit 164. Control signals for controlling medium attachment units 160–164 are received from an associated wide area network media access control.

Figure 7:
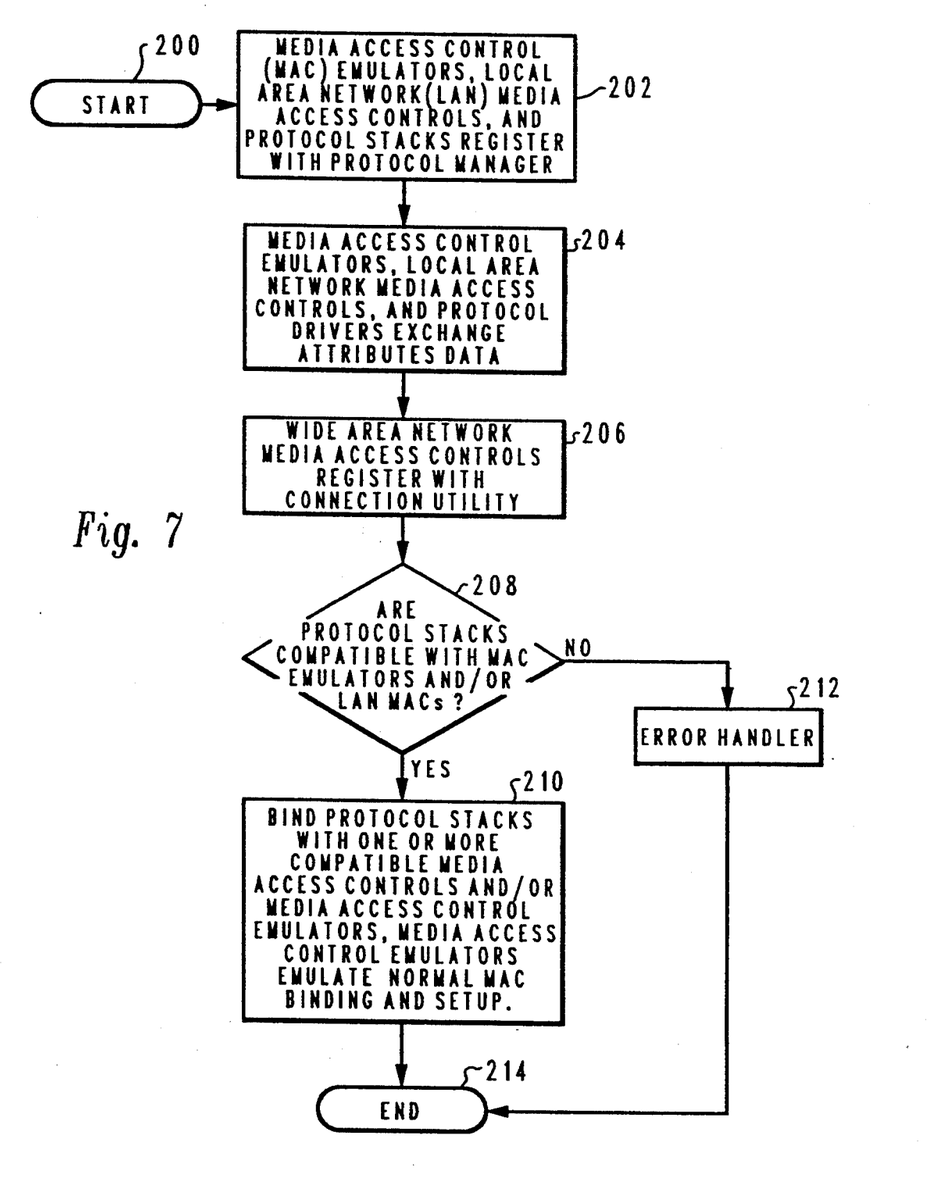
FIG. 7 is a high-level logic flowchart representation of the process of initializing an environment in accordance with the method and system of the present invention.

With reference to FIG. 7, there is depicted a high-level logic flowchart representation of the process of initializing an environment in accordance with the method and system of the present invention. As illustrated, the process begins at block 200 and thereafter proceeds to block 202. Block 202 illustrates the process of registering media access control emulators, local area network media access controls, and protocol stacks with the protocol manager. Such a registration process permits the protocol manager, such as protocol manager 148 of FIG. 6, to record tables in memory containing addresses, features, functions, and attributes of media access control emulators, local area network media access controls, and protocol stacks which are present in the communication environment.

Next, as illustrated at block 204, the media access control emulators, local area network media access controls, and protocol drivers exchange attributes data. Such attributes data may include a list of functions performed, addresses of available function routines, and status information.

Next, as depicted at block 206, the process registers wide area network media access controls with the connection utility. This registration process may be done at any time prior to using the communications channel, and is analogous to the registration described above with reference to block 202, in that the connection utility locates and learns about the entities it manages. More information about wide area network media access controls may be found in U.S. patent application Ser. No. 08/049,895, entitled "COMMUNICATION OF LOCAL AREA NETWORK BASED APPLICATIONS ON A SWITCHED NETWORK", filed Apr. 19, 1993, Attorney Docket No. AT9-93-019, assigned to the assignee herein, and incorporated herein by reference.

After such attributes data has been exchanged between media access control emulators, local area network media access controls, and protocol drivers, the process then determines whether or not the available protocol stacks are compatible with the media access control emulators and/or the local area network media access controls, as depicted at block 208. If the protocol stacks are compatible with the media access control emulators and/or the local area network media access controls, the process passes to block 210. If not, the process passes from block 208 to block 212, wherein the process deals with compatibility problems with an error handler routine. Thereafter, the process ends at block 214.

Once the process determines the protocol stacks are compatible with the media access control emulators and/or the local area network media access controls, the process binds the protocol stacks with one or more compatible media access controls and/or media access control emulators, as depicted at block 210. During this binding process, the media access control emulators emulate normal media access control binding and set up characteristics. Thereafter, the initialization process terminates, as illustrated at block 214.

Figure 8:
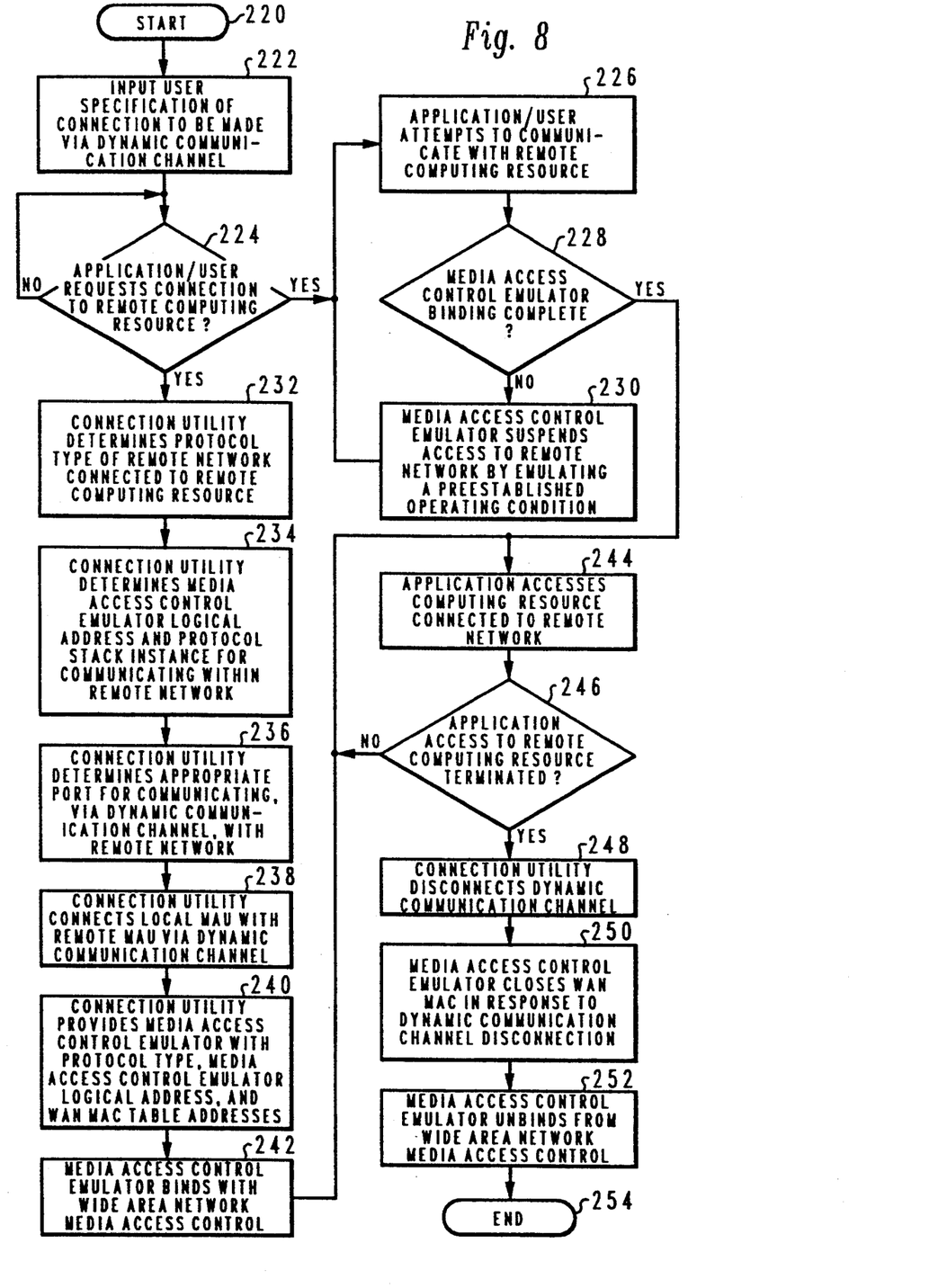
FIG. 8 is a high-level logic flowchart representation of the process of connecting to, and allowing an application to communicate with, a computing resource connected to a remotely located network via a dynamic communications channel in accordance with the method and system of the present invention.

Referring now to FIG. 8, there is depicted a high-level logic flowchart representation of the process of connecting to, and allowing an application to communicate with, a computing resource connected to a remotely located network via a dynamic communications channel in accordance with the method and system of the present invention. As illustrated, the process begins at block 220 and thereafter passes to block 222. Block 222 illustrates the process of inputting user specification of the connection to be made by an application or a user via a dynamic communication channel. In this step, a data processing system user may specify the protocol type to be utilized once a connection is established via a dynamic communications channel, the logical address of the media access control emulator associated with the protocol stack instance utilized by the LAN application during communication with the remote network, and the wide area network port within the data processing system which will be utilized to connect to the dynamic communications channel.

Next, the process determines whether or not an application or user has requested a connection to a remote computing resource, as depicted at block 224. If an application or user has not requested a connection to a remote computing resource, the process iterates until such time as an application or user has requested a connection to a remote computing resource, as illustrated by the "no" branch from block 224. If an application or user has requested a connection to a remote computing resource, the process proceeds along two branches of the flowchart.

In a first branch of the process, the requesting application or user attempts to communicate with the remote computing resource, as illustrated at block 226. Then, the process determines whether or not the media access control emulator has completed binding with the wide area network media access control, as depicted at block 228. If such binding is not complete, the process utilizes the media access control emulator to suspend access to the remote network by emulating a pre-established operating condition, as illustrated at block 230. If such binding is complete, the process continues at block 244 as described below.

In a preferred embodiment of the present invention, such a pre-established operating condition may be provided by discarding data initially sent from the requesting application through the associated protocol stack to the media access control emulator. Thereafter, the media access control emulator may return an "out of resource" indication to the requesting application. In response to receiving this out of resource indication, the application may retransmit the data packet initially sent to the media access control emulator. In other situations, the data sent by the application may be returned to the application, or queued for later transmission to the remotely located computing resource. Therefore, such a pre-established operating condition depends on the particular communications environment and the known set of responses by a particular application to a particular situation.

In a second branch, the process uses the connection utility to determine the protocol type of the remote network connected to the remote computing resource, as illustrated at block 232. Such information concerning the protocol type may be obtained by looking to the information previously provided by the data processing system user concerning the connection via the dynamic communication channel.

Thereafter, the process utilizes the connection utility to determine the media access control emulator and protocol stack instance for communicating within the remote network, as depicted at block 234.

Next, as illustrated at block 236, the process utilizes the connection utility to determine the appropriate port within the data processing system for communicating, via the dynamic communication channel, with the remote network. Here again, this information may be obtained by looking to the information previously provided by the data processing system user concerning the connection via the dynamic communications channel.

Next, as depicted at block 238, the process utilizes the connection utility to connect the local medium attachment unit with the remote medium attachment unit via the dynamic communication channel.

Next, as illustrated at block 240, the process utilizes the connection utility to provide the media access control emulator with the predetermined protocol type, media access control emulator logical address, and wide area network media access control table addresses. Once the media access control emulator has this information, the process binds the media access control emulator with the wide area network media access control, as depicted at block 242.

Next, the application is allowed to access the computing resource connected to the remotely located network, as illustrated at block 244. The process then determines whether or not application access to the remote computing resource has been terminated, as depicted at block 246. If application access to the remote computing resource has not been terminated, the process continues to allow application access to the computing resource, as illustrated by the "no" branch passing to block 244. If application access to the remote computing resource has been terminated, the process utilizes the connection utility to disconnect the dynamic communications channel, as illustrated at block 248.

Thereafter, the process causes the media access control emulator to close the wide area network media access control in response to the dynamic communications channel disconnection, as depicted at block 250. Finally, the process utilizes the media access control emulator to unbind from the wide area network media access control, as illustrated at block 252. The process then terminates at block 254.

Figure 9:
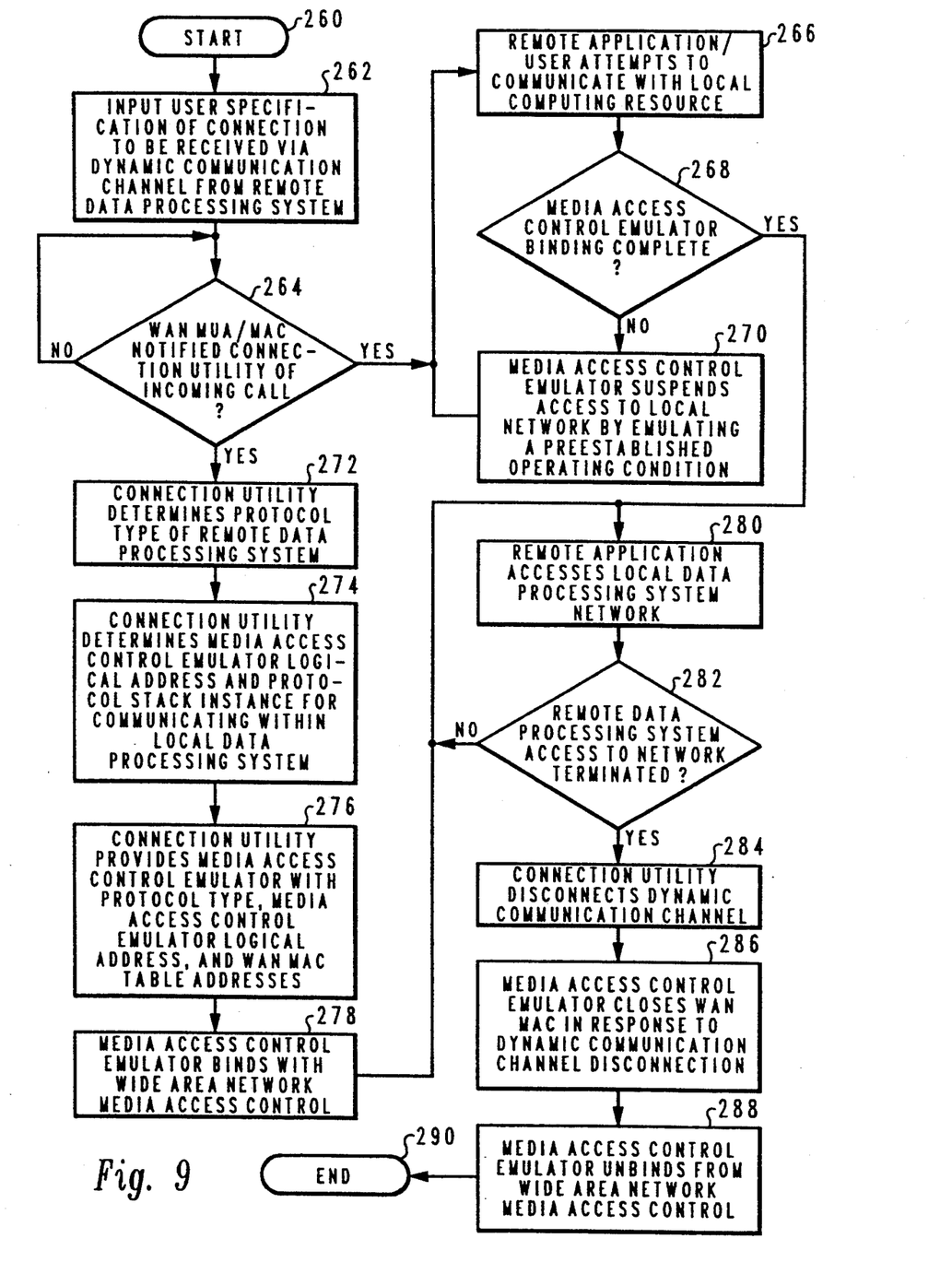
FIG. 9 is a high-level logic flowchart representation of the process of receiving an incoming communication via a dynamic communication channel in accordance with the method and system of the present invention.

With reference now to FIG. 9, there is depicted high-level logic flowchart representation of the process of receiving an incoming communication via a dynamic communication channel in accordance with the method and system of the present invention. As illustrated, the process begins at block 260, and thereafter passes to block 262. Block 262 illustrates the process of inputting a user specification of the connection to be received via the dynamic communication channel initiated from a remote data processing system.

Next, the process determines whether or not the wide area network media access control has notified the connection utility of an incoming call via the wide area network medium attachment unit and the dynamic communications channel, as illustrated at block 264. If the wide area network media access control has not received a call, the process iterates until such time as a call is received, as illustrated by the "no" branch from block 264. If the wide area network media access control has received a call via the dynamic communications channel, the process proceeds along two paths of operation.

In a first path of operation, the process the remote application or user attempts to communicate with the local computing resource, as depicted at block 266. Thereafter, the process determines whether or not the process of binding the media access control emulator with the wide area media access control has been completed, as illustrated at block 268. If such binding is not complete, the process utilizes the media access control emulator to suspend access to the remote network by emulating a pre-established operating condition, as illustrated at block 270. As described previously, the media access control emulator may suspend access by discarding a packet of data sent to the media access control emulator by the remote application, and thereafter the media access control emulator may return and "out of resource" indication to the remote application. Referring again to block 268, if such binding is complete, the process continues at block 280 as described below.

In a second path of operation, the connection utility determines the protocol type of the remote data processing system, as depicted at block 272. Thereafter, the process utilizes the connection utility to determine the media access control emulator logical address and protocol stack instance for communicating with the local data processing system, as illustrated at block 274. Next, the process utilizes the connection utility to provide the media access control emulator with the protocol type, media access control emulator logical address, and wide area network media access control table addresses, as depicted at block 276.

After the media access control emulator receives the necessary information described above from the connection utility, the media access control emulator binds with the wide area network media access control, as illustrated at block 278. This binding process occurs while the media access control emulator suspends access to the local network as depicted at block 270.

Once the media access control emulator and the wide area network media access control have completed the binding operation, the application within the remote data processing system is allowed to access the local network, as depicted at block 280. Thereafter, the process determines whether or not the access to the local network has been terminated, as illustrated at block 282. If the access to the network has not been terminated, the application within the remote data processing system may continue to access the local network as the process iteratively passes to block 280, as illustrated by the "no" branch from block 282. If the access to the local network by the remote application has been terminated, the process utilizes the connection utility to disconnect the dynamic communications channel, as depicted at block 284.

Next, the process utilizes the media access control emulator to close the wide area network media access control in response to the disconnection of the dynamic communications channel, as illustrated at block 286. Finally, the process utilizes the media access control emulator to unbind from the wide area network media access control, as depicted at block 288. Thereafter, the process ends at block 290.

Those persons skilled in the art should recognize that the processes depicted in FIGS. 8 and 9 may be performed concurrently within the data processing system. Thus, applications within a data processing system may initiate outgoing communications via a dynamic communications channel connected to a first port, while the same or other applications are receiving incoming communications via another dynamic communication channel connected to a second port.

Upon reference to the foregoing, those persons skilled in the art of network communications will appreciate that the method and system of the present invention enables local area network (LAN) applications to communicate with computing resources via a dynamic communication channel, such as the public switched telephone network, without modification to the LAN applications and existing multilayer protocol stacks.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for interfacing a computing resource coupled to a remotely located network with an application running within said data processing system via a dynamic communication channel, said network including a multilayered communication architecture, implemented utilizing a multilayered protocol stack, for facilitating communication between network resources, said method comprising the steps of:
   providing a media access control emulator for interfacing with an application running within said data processing system;
   providing a connection utility for managing communication between said media access control emulator and said dynamic communication channel;
   presenting a standard media access control interface to said application running within said data processing system utilizing said media access control emulator;
   in response to an application attempt to communicate with said computing resource coupled to said remotely located network:
   (a) automatically suspending access to said computing resource coupled to said remotely located network by utilizing said media access control emulator to emulate a preestablished operating condition;
   (b) simultaneously establishing communication with said remotely located network via said dynamic communication channel utilizing said connection utility; and
   allowing said application access to said computing resource coupled to said remotely located network via said dynamic communication channel, wherein said media access control emulator and said connection utility mask the dynamic nature of said dynamic communication channel from said application.

2. The method according to claim 1 further including the step of binding said media access control emulator with said multilayered protocol stack.

3. The method according to claim 1 wherein the step of simultaneously establishing communication with said remotely located network via said dynamic communication channel utilizing said connection utility includes the steps of:
   determining an appropriate protocol for communicating with said remotely located network; and
   binding said media access control emulator with a selected wide area network media access control coupled to a selected medium attachment unit as determined by said appropriate protocol for communicating with said remotely located network.

4. The method according to claim 1 wherein said dynamic communication channel is a public switched telephone network.

5. The method according to claim 1 wherein said step of automatically suspending access to said computing resource coupled to said remotely located network by utilizing said media access control emulator to emulate a preestablished operating condition includes the steps of:
   discarding a packet of data sent to said media access control emulator by said application; and
   returning an out of resource indication to said application.

6. The method according to claim 1 further including the step of closing and unbinding said selected wide area network media access control from said media access control emulator when access to said computing resource coupled to said remotely located network is terminated.

7. The method according to claim 1 wherein the step of presenting a standard media access control interface to an application running within said data processing system utilizing said media access control emulator further includes presenting a high level data link control (HDLC) media access control interface to an application running within said data processing system utilizing said media access control emulator.

8. A means for interfacing a computing resource coupled to a remotely located network with an application running within a data processing system via a dynamic communication channel, said network including a multilayered communication architecture, implemented utilizing a multilayered protocol stack, for facilitating communication between network resources, comprising:
   a media access control emulator for interfacing with an application running within said data processing system;

a connection utility for managing communication between said media access control emulator and said dynamic communication channel;

said means for interfacing being operable in a plurality of modes, including:

(a) an emulation mode wherein said media access control emulator presents a standard media access control interface to said application running within said data processing system;

(b) a suspend mode wherein, in response to an application attempt to communicate with said computing resource coupled to said remotely located network, said media access control emulator automatically suspends access to said computing resource coupled to said remotely located network by emulating a preestablished operating condition;

(c) a connect mode wherein said connection utility establishes communication with said remotely located network via said dynamic communication channel while said media access control emulator suspends access to said computing resource coupled to said remotely located network; and (d) a data transfer mode wherein said media access control emulator allows said application to access to said computing resource coupled to said remotely located network via said dynamic communication channel by transferring data between said multilayered protocol stack and said dynamic communication channel.

9. The means for interfacing according to claim 8 further including a binding mode of operation wherein said media access control emulator binds with said multilayered protocol stack.

10. The means for interfacing according to claim 8 wherein said connect mode includes the steps of:

determining an appropriate protocol for communicating with said remotely located network; and binding said media access control emulator with a selected wide area network media access control coupled to a selected medium attachment unit as determined by said appropriate protocol for communicating with said remotely located network.

11. The means for interfacing according to claim 8 wherein said dynamic communication channel is a public switched telephone network.

12. The means for interfacing according to claim 8 wherein said suspend mode includes the steps of:

discarding a packet of data sent to said media access control emulator by said application; and returning an out of resource indication to said application.

13. The means for interfacing according to claim 8 further including a close and unbind mode wherein said connection utility directs said media access control emulator to close and unbind said selected wide area network media access control when access to said computing resource coupled to said remotely located network is terminated.

14. The means for interfacing according to claim 8 wherein said emulation mode includes the step of presenting a high level data link control (HDLC) media access control interface to an application running within said data processing system.

15. A communications interface system for interfacing a data processing system with a computing resource coupled to a remotely located network with an application running within said data processing system via a dynamic communication channel, said network including a multilayered communication architecture, implemented utilizing a multilayered protocol stack, for facilitating communication between network resources, comprising:

a media access control emulator for presenting a standard media access control interface to said application running within said data processing system, and for automatically suspending access to said computing resource coupled to said remotely located network by emulating a preestablished operating condition in response to an application attempt to communicate with said computing resource coupled to said remotely located network;

a connection utility for managing communication between said media access control emulator and said dynamic communication channel, and for establishing communication with said remotely located network via said dynamic communication channel while said media access control emulator automatically suspends access to said computing resource coupled to said remotely located network; and means for allowing said application access to said computing resource coupled to said remotely located network via said dynamic communication channel, wherein said media access control emulator and said connection utility mask the dynamic nature of said dynamic communication channel from said application.

16. The communications interface system according to claim 15 further including means for binding said media access control emulator with said multilayered protocol stack.

17. The communications interface system according to claim 15 wherein said connection utility includes:

means for determining an appropriate protocol for communicating with said remotely located network; and means for binding said media access control emulator with a selected wide area network media access control coupled to a selected medium attachment unit as determined by said appropriate protocol for communicating with said remotely located network.

18. The communications interface system according to claim 15 wherein said dynamic communication channel is a public switched telephone network.

19. The communications interface system according to claim 15 wherein said means for automatically suspending access to said computing resource coupled to said remotely located network includes:

means for discarding a packet of data sent to said media access control emulator by said application; and means for returning an out of resource indication to said application.

20. The communications interface system according to claim 15 wherein said connection utility further includes means for directing said media access control emulator to close and unbind said selected wide area network media access control when access to said computing resource coupled to said remotely located network is terminated.

21. The communications interface system according to claim 15 wherein said means for presenting a standard media access control interface includes means for presenting a high level data link control (HDLC) media access control interface to an application running within said data processing system.

* * * * *